(12) United States Patent
Onishi et al.

(10) Patent No.: US 6,561,655 B2
(45) Date of Patent: May 13, 2003

(54) PROJECTOR

(75) Inventors: Satoshi Onishi, Sakai (JP); Kazuhiko Inoue, Suita (JP); Iwao Adachi, Moriguchi (JP); Yasumasa Sawai, Yamatotakada (JP); Hideki Nagata, Kobe (JP)

(73) Assignee: Minolta Co., Ltd., Osaka (JP)

( * ) Notice: Subject to any disclaimer, the term of this patent is extended or adjusted under 35 U.S.C. 154(b) by 5 days.

(21) Appl. No.: 09/901,357

(22) Filed: Jul. 9, 2001

(65) Prior Publication Data

US 2002/0008852 A1 Jan. 24, 2002

(30) Foreign Application Priority Data

Jul. 12, 2000 (JP) .......................................... 2000-211342
Jul. 14, 2000 (JP) .......................................... 2000-214245

(51) Int. Cl.⁷ .......................... G03B 21/18; G03B 21/16; G03B 21/26
(52) U.S. Cl. ............................. 353/61; 353/52; 353/57; 353/60
(58) Field of Search .............................. 353/61, 52, 57, 353/60; 352/202, 198

(56) References Cited

U.S. PATENT DOCUMENTS 2,821,126 A * 1/1958 Heller .......................... 353/61
3,610,747 A * 10/1971 Bickel .......................... 352/146
3,858,971 A * 1/1975 Studley ....................... 353/27 R
4,582,406 A * 4/1986 Wally ............................ 353/55

FOREIGN PATENT DOCUMENTS

| JP | 09-049998 A | 2/1997 |
| JP | 09-130713 A | 5/1997 |
| JP | 11-082391 A | 3/1999 |
| JP | 11-160793 A | 6/1999 |

* cited by examiner

Primary Examiner—Russell Adams
Assistant Examiner—Andrew Sever
(74) Attorney, Agent, or Firm—Sidley Austin Brown & Wood LLP (57) ABSTRACT

A projector includes a duct having a connecting end for connection to an air inlet provided in a housing, and an air intake end for drawing in outside air for cooling the interior of the projector. The duct is made of a soft or flexible material and is capable of altering its shape. Thus, the duct can change the position of the air intake end in space, for example, to different positions. Further, the duct is pivotable on a pivot axis, and thus can change the opening direction of the air intake end circumferentially about the pivot axis. Therefore, selection of the position and/or opening direction of the air intake end so as to draw in the outside air suitable for cooling the interior depending on the usage forms of the projector achieves efficient cooling of the interior of the projector.

8 Claims, 12 Drawing Sheets

PROJECTOR

This application is based on applications Nos. 2000-211342 and 2000-214245 filed in Japan, the contents of which are hereby incorporated by reference.

BACKGROUND OF THE INVENTION

1. Field of the Invention

The present invention relates to a projector having an outwardly extending duct and a duct for carrying a cooling air flow.

2. Description of the Background Art

Projectors are not only placed on a desk when in use but also used in various forms, for example, a pendent form in which a projector is mounted on or suspended from the ceiling of a room, a stacked form in which a plurality of projectors are vertically stacked one upon another, and a rear-projection form in which a projector is placed in a box-shaped enclosure.

However, the above-mentioned variations in usage form of the projector lead to variations in outside air intake condition at an air inlet of the projector. Depending on usage forms, the air inlet does not always satisfy a proper air intake condition, which might result in lower efficiency of cooling of the interior of the projector by a cooling fan.

On the other hand, a projector uses a duct for directing outside air (a cooling air flow) external to the projector thereinto to cool heat sources such as a liquid crystal panel and a light source lamp which are provided in the projector.

The projector contains heat-sensitive components such as an electronic circuit and an optical component.

Unfortunately, since the duct of the above-mentioned projector is made of plastic or the like and has constant thermal conductivity, placing the duct near the heat source such as the light source lamp causes the cooling air flow to be influenced by the heat source, resulting in the temperature rise of the cooling air flow. To prevent this, there arises a design constraint that the duct must be placed in isolation from the heat source.

Further, when placed near the heat source, the heat-sensitive component such as the electronic circuit is affected by heat radiation from the heat source. To prevent this, there arises a design constraint that the heat-sensitive component must be placed in isolation from the heat source.

SUMMARY OF THE INVENTION

The present invention is intended for a projector.

According to the present invention, the projector comprises: a projection section including an optical element for projecting an optical image onto a predetermined image surface; a housing for housing the projection section therein and having at least one opening, the housing being hollow; a duct disposed to extend from the opening to the outside of the housing, the duct having a connecting end for connection to the opening and an open end open to the outside of the housing; and an air flow generator for generating an intake air flow directed from the outside of the housing through the opening of the housing to a predetermined to-be-cooled portion of the projection section in the housing, the predetermined to-be-cooled portion being a heat-generating optical element, wherein the duct is movable to make the position and/or opening direction of the open end variable. Therefore, the projector is capable of drawing in the outside air from an outside position or direction in which the outside air suitable for cooling is obtained, thereby to efficiently cool the interior of the projector.

According to another aspect of the present invention, the projector comprises: a projection section including an optical element for projecting an optical image onto a predetermined image surface; a housing for housing the projection section therein and having at least one opening, the housing being hollow; a duct disposed to extend from the opening to a predetermined to-be-cooled portion of the projection section, the predetermined to-be-cooled portion being a heat-generating optical element, at least part of the duct being made of a thermal insulation material; and an air flow generator for generating an intake air flow directed from the outside of the housing through the opening of the housing via the duct to the predetermined to-be-cooled portion in the housing. Therefore, the projector is capable of shutting off heat radiation from a heat source, thereby to contribute to an improvement in design flexibility of the projector.

It is therefore an object of the present invention to provide a projector capable of efficiently cooling the interior thereof.

It is another object of the present invention to provide a projector with improved design flexibility.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>
<Construction of Principal Parts of Projector>

Figure 1:
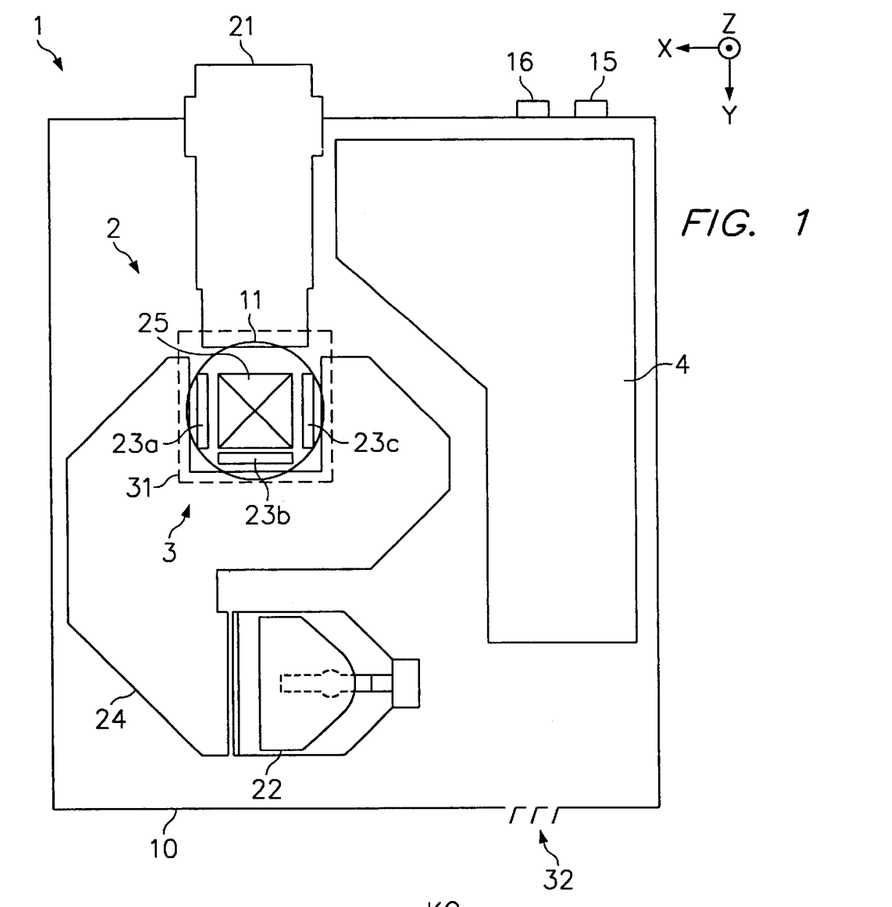
FIG. 1 is a plan view of a projector according to a first preferred embodiment of the present invention.
Figure 2:
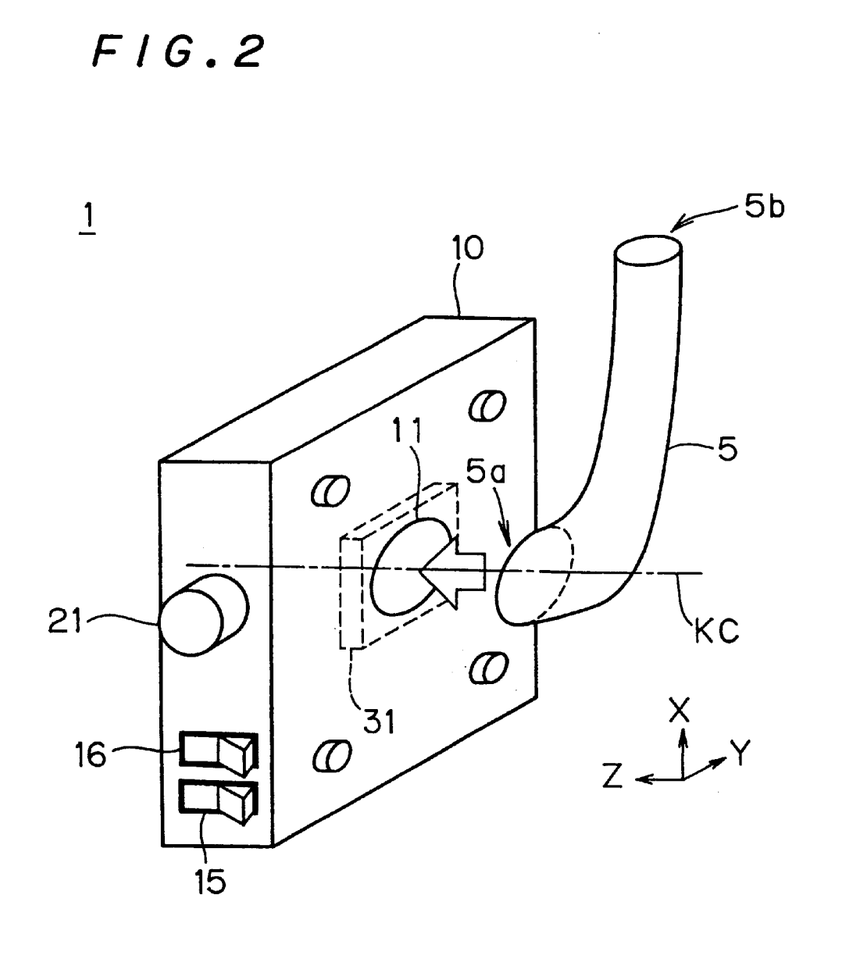
FIG. 2 is an external view of the projector.

FIG. 1 is a plan view of a projector 1 according to a first preferred embodiment of the present invention. FIG. 2 is an external view of the projector 1.

The projector 1 comprises a projection section 2 housed in a hollow housing 10, a cooling section 3 for cooling the projection section 2, and a control section 4 for controlling the projection section 2 and the cooling section 3. The projector 1 has a tubular duct 5 for connection to an air inlet 11 provided in a bottom surface of the housing 10, a main power switch 15 provided on a front surface of the housing 10 for switching the power on/off, and a selector switch 16 for selection between an intake air flow and an exhaust air flow produced by a cooling fan 31 to be described later.

The air inlet 11 has a circular opening, and a cooling air flow produced by the cooling fan 31 (to be described later) is circulated through the air inlet 11.

The projection section 2 comprises a projection lens 21, a light source lamp 22, and three liquid crystal panels 23a, 23b, 23c. The projection section 2 further comprises an illumination optical system 24 for separating light incident from the light source lamp 22 into light rays of three primary colors, and a prism 25 for combining together the three light rays passed through the three liquid crystal panels 23a, 23b, 23c.

The light source lamp 22 becomes a heat source which generates heat during use, and therefore is one to-be-cooled element which must be forcedly air-cooled by the cooling air flow.

The liquid crystal panels 23a, 23b, 23c are capable of displaying image information inputted from a personal computer or a tuner connected to the projector 1 for transmission thereof in the form of projected images. In this preferred embodiment, the inputted image information is separated into image components of three primary colors (R (red), G (green) and B (blue)) which in turn are displayed on the respectively corresponding liquid crystal panels 23a, 23b, 23c. The temperature of the liquid crystal panels 23a, 23b, 23c does not remarkably rise when the liquid crystal panels 23a, 23b, 23c themselves are energized. However, the liquid crystal panels 23a, 23b, 23c partially absorb the outgoing light rays from the illumination optical system 24 to store light energy therein, resulting in the temperature rise thereof. Thus, the liquid crystal panels 23a, 23b, 23c which act as heat sources are also to-be-cooled elements.

In the illumination optical system 24, the light ray emitted from the light source lamp 22 is subjected to a polarization conversion, and thereafter a dichroic mirror generates the three primary color light rays (R, G and B) from the above-mentioned light ray. The three generated light rays enter the three liquid crystal panels 23a, 23b, 23c, respectively.

The prism 25 is capable of combining the R, G and B images displayed on the liquid crystal panels 23a, 23b, 23c together to project the resultant image light ray onto the projection lens.

The cooling section 3 comprises the cooling fan 31 and an air vent 32.

The cooling fan 31 has an outside shape of a rectangular parallelepiped, and includes an axial fan in which a dc motor rotates blades.

Reversing the polarity of a supply voltage to the cooling fan 31 enables the cooling fan 31 to rotate in both forward and reverse directions. More specifically, the cooling fan 31, when rotating in the forward direction, functions as an air intake means for forcing the outside air external to the housing 10 through the air inlet 11 into the housing 10, and when rotating in the reverse direction, functions as an air exhaust means for exhausting the air heated because of heat exchange in the housing 10 from the air inlet 11. Manual operation of the selector switch 16 makes the selection between the air intake operation and the air exhaust operation of the cooling fan 31 serving as an air flow generating means capable of driving in the forward and reverse directions, thereby selectively generating an intake air flow Fa and an exhaust air flow Fb both shown in FIG. 3.

The air vent 32 comprises a plurality of slits in the rear surface of the housing 10. When the cooling fan 31 is used for air intake, the air vent 32 allows the air heated to an elevated temperature because of the heat exchange by the light source lamp 22 and the liquid crystal panels 23a, 23b, 23c to be exhausted therefrom to the outside of the housing 10. When the cooling fan 31 is used for air exhaust, the outside air is drawn through the air vent 32 into the housing 10, and the resultant heated air circulated in the housing 10 is exhausted from the cooling fan 31.

The cooling section 3 may further comprise a cooling air duct (not shown) for directing to the light source lamp 22 the cooling air flow drawn into the housing 10 by the cooling fan 31 and passed through the liquid crystal panels 23a, 23b, 23c. The cooling air duct can direct the cooling air flow passed through the liquid crystal panels 23a, 23b, 23c to the light source lamp 22.

The control section 4 functions as a power source section for the projector 1, and comprises a CPU and a memory. The control section 4 is connected to the projection section 2 and the cooling section 3 to exercise centralized control thereof.

The duct 5 having movability to be described later is detachable from and attachable to the air inlet 11, and has a connecting end 5a for connection to the opening end of the housing 10, i.e., the air inlet 11, and an air intake end 5b for drawing in the outside air. The detachable/attachable duct 5 may be attached to the air inlet 11 depending on the use conditions of the projector 1 to improve convenience. It is preferable to ensure hermeticity at the connection of the connecting end 5a and the air inlet 11 to prevent the outside air from flowing in.

The duct 5 is made of a soft or flexible material such as rubber, and is capable of altering its shape. Thus, the duct 5 can continuously change the position of the air intake end 5b in space, for example, to positions P1, P2 and P3 shown in FIG. 3. This may be regarded as an extension of the air inlet 11 to the air intake end 5b serving as an open end of the duct 5 in the space external to the housing 10.

Figure 3:
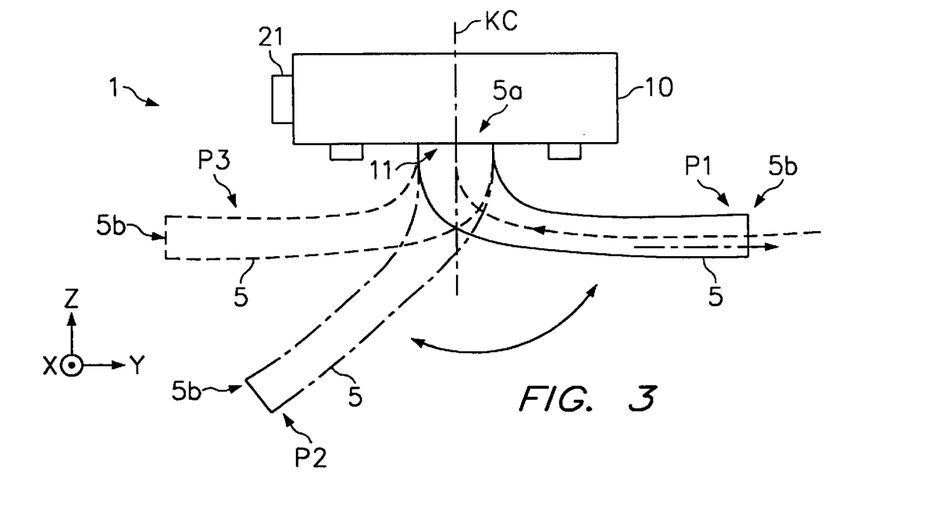
FIG. 3 is a view for illustrating a function of a duct.

Further, the duct 5 is pivotable on a pivot axis KC shown in FIG. 3. Therefore, the duct 5 can change the opening direction of the air intake end 5b circumferentially about the pivot axis KC.

It is possible to cool the projection section 2 to some degree if the duct 5 is not connected to the air inlet 11 of the housing 10. However, placing the air intake end 5b of the duct 5 in a cool location, for example, near a cool air blow-off port of an air conditioner allows the duct 5 to draw in the outside air at a relatively low temperature to efficiently cool the interior of the housing 10.

The projector 1 constructed as above discussed will be described using specific examples of three usage forms.

<Usage Forms of Projector 1>

Figure 4:
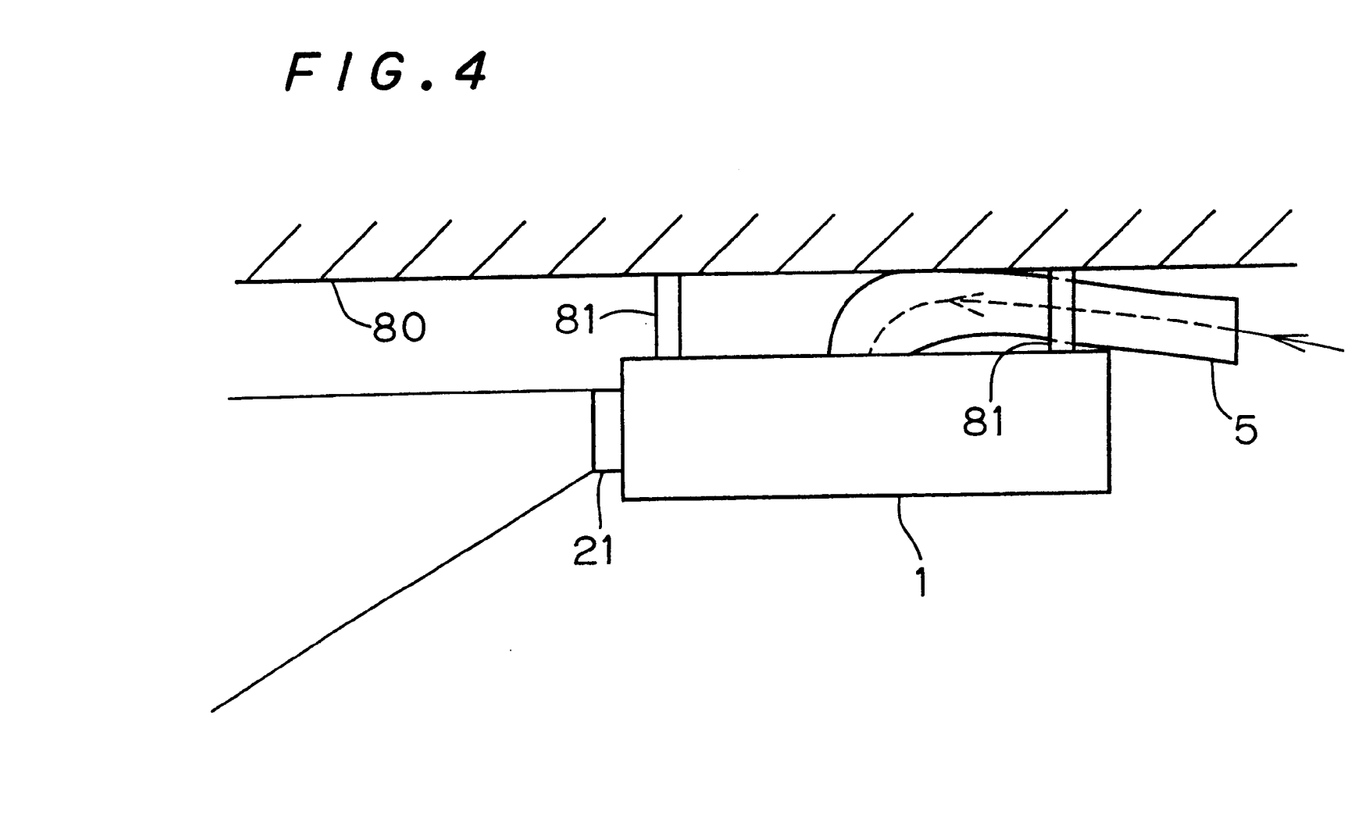
FIG. 4 shows a projector suspended from a ceiling.

FIG. 4 shows the projector 1 suspended from a ceiling.

The projector 1 is suspended by support members 81 mounted to the ceiling 80, and is positioned upside down. With the projector 1 in such a pendent form, the air inlet 11 provided in the bottom surface of the housing 10 is opposed to the ceiling 80. With the air inlet 11 thus positioned upside, the air inlet 11 is prone to gather dust and the like when the projector 1 is not in use. This deteriorates the air intake efficiency of the outside air to reduce cooling efficiency.

To prevent such a drawback, the duct 5 is connected to the air inlet 11 and curved so that the air intake end 5b is not positioned upside. This avoids the influence of the dust and the like upon the air inlet 11 to improve the air intake efficiency, thereby increasing the cooling efficiency.

Figure 5:
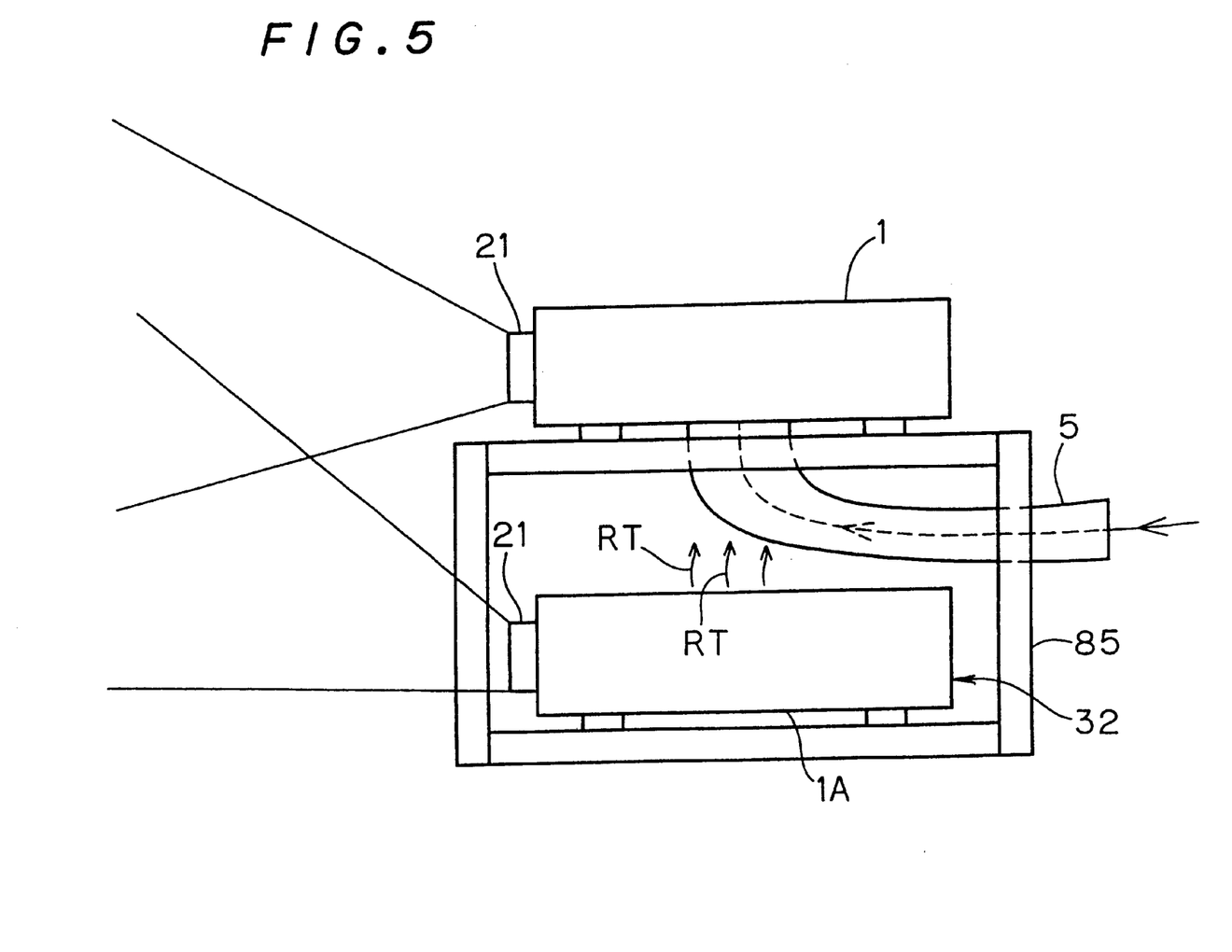
FIG. 5 shows two projectors stacked one over the other.

FIG. 5 shows two projectors stacked one over the other.

The two projectors 1 and 1A are vertically stacked in two tiers by a support member 85. The two projectors 1 and 1A in such a stacked form can project respective images so as to make an overlap to produce the effect of increasing the brightness of the projected images. The projector 1A in the lower tier is similar in construction to the above-mentioned projector 1 except that the duct 5 is not attached thereto. With the two projectors thus provided in the stacked form, the projector 1A disposed under the air inlet 11 of the projector 1 in the upper tier acts as a heat source, and exhaust heat RT from the projector 1A raises the temperature of air near the bottom surface of the projector 1. If the projector 1 draws in the outside air through the air inlet 11, the efficiency of cooling the interior of the projector 1 is reduced.

To prevent such a drawback, the duct 5 is connected to the air inlet 11 of the projector 1 in the upper tier, and the air intake end 5b of the duct 5 is placed in a location where there is no influence of the exhaust heat RT from the projector 1A in the lower tier. This prevents the reduction in efficiency of cooling the interior of the projector 1 in the upper tier.

Additionally, in the case of such a stacked form, the generation of an exhaust air flow from the cooling fan 31 of the projector 1A in the lower tier allows the projector 1A to draw in the outside air at a relatively low temperature behind the projector 1A through the air vent 32 and to exhaust the air flow heat-exchanged in the projector 1A from the air inlet 11 in the bottom surface thereof. This contributes to the increase in efficiency of cooling the interior of the projector 1A.

Figure 6:
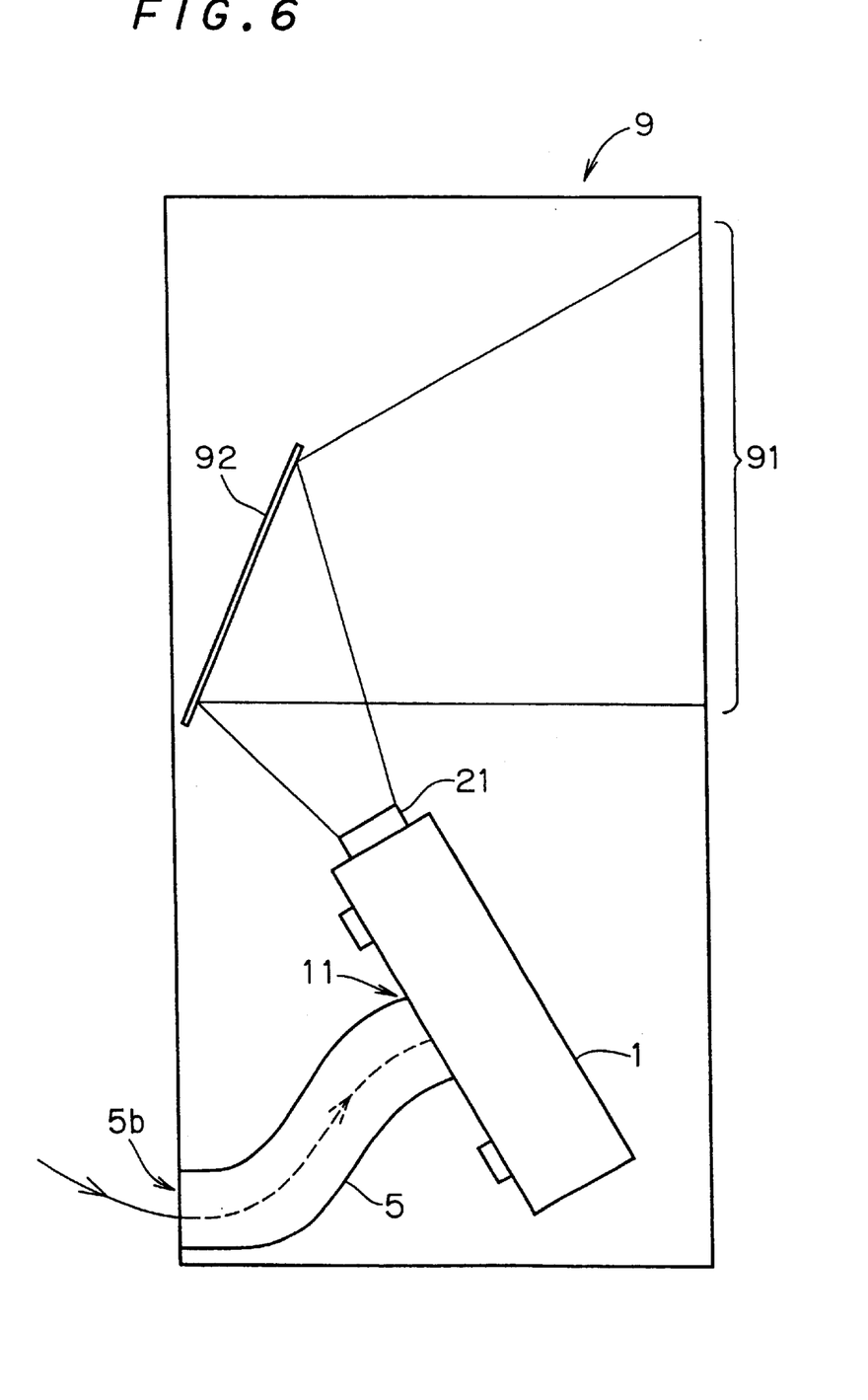
FIG. 6 shows the projector placed in a rear-projection enclosure.

FIG. 6 shows the projector 1 placed in an enclosure for rear projection.

The projector 1 is placed in an inclined position in the enclosure 9. The enclosure 9 includes a screen 91 for image projection, and a mirror 92 for reflecting the projected image from the projector 1 toward the screen 91. With this arrangement, the projector 1 may be used in a manner similar to a television. With the projector 1 placed in the enclosure 9, the heated air exhausted from the projector 1 fills the enclosure 9 to raise the air temperature in the enclosure 9. Then, if the projector 1 draws in the heated air in the enclosure 9 through the air inlet 11, the projector 1 is influenced by its own exhaust air heat to result in reduction in cooling efficiency.

To prevent such a drawback, the duct 5 is connected to the air inlet 11, and the air intake end 5b of the duct 5 is placed on the outer surface of the enclosure 9 so as to draw in the air external to the enclosure 9. Thus, the outside air drawn into the projector 1 suppresses the influence of the heated air inside the enclosure to prevent the reduction in cooling efficiency.

In the case of such arrangement, the generation of an exhaust air flow from the cooling fan 31 of the projector 1 allows the heated air heat-exchanged in the projector 1 to be exhausted from the air inlet 11 to the outside of the enclosure 9. This provides ventilation of the enclosure 9, to contribute to the cooling of the interior of the projector 1.

The above-mentioned construction and operation of the projector 1 enable the duct 5 to draw in the outside air under suitable conditions depending on the usage forms, to thereby efficiently cool the interior of the projector 1. Moreover, the efficient cooling of the interior of the projector 1 allows the selection of a lower-power cooling fan than ever, contributing to reduction in noise and power consumption.

Additionally, the air intake end 5b of the duct 5 is placed in any desired location. Therefore, orienting the air intake end 5b toward a location where a user is absent suppresses user discomfort.

<Modifications of First Preferred Embodiment>

Figure 7:
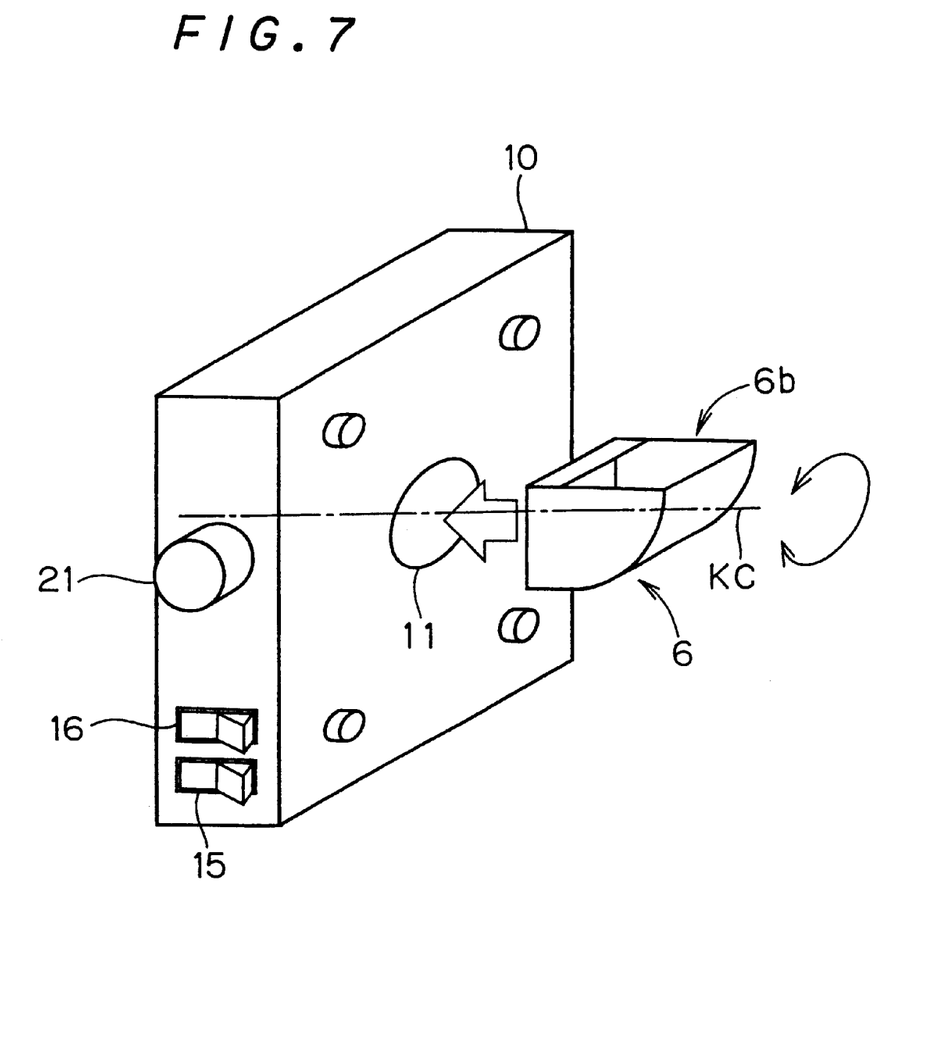
FIG. 7 is a view for illustrating connection of another duct to a housing.

The duct for connection to the air inlet 11 of the projector 1 is not limited to the tubular duct made of a soft material, but may be an L-shaped duct 6 to be described below.

FIG. 7 is a view for illustrating the connection of the duct 6 to the housing 10.

The duct 6 is made of a rigid material such as plastic. Like the above-mentioned duct 5, the duct 6 is detachable from and attachable to the air inlet 11 of the housing 10, and, when attached to the air inlet 11, is pivotable on the pivot axis KC to provide movability.

Such a construction of the duct 6 allows the opening direction of an air intake end 6b of the duct 6 to change circumferentially about the pivot axis KC. Therefore, like the above-mentioned duct 5, the duct 6 can efficiently draw in the outside air external to the housing 10.

The shape of the duct is not limited to a tubular shape, but may be a rectangular cross-sectional shape, a polygonal cross-sectional shape and the like.

The increase in length of the duct increases the flexibility of placement of the air intake end, but also increases the duct resistance thereof. Therefore, it is preferable to select the duct length in view of such circumstances.

The movability of the duct may be such that at least one of the opening end position and the opening direction is variable.

Figure 8:
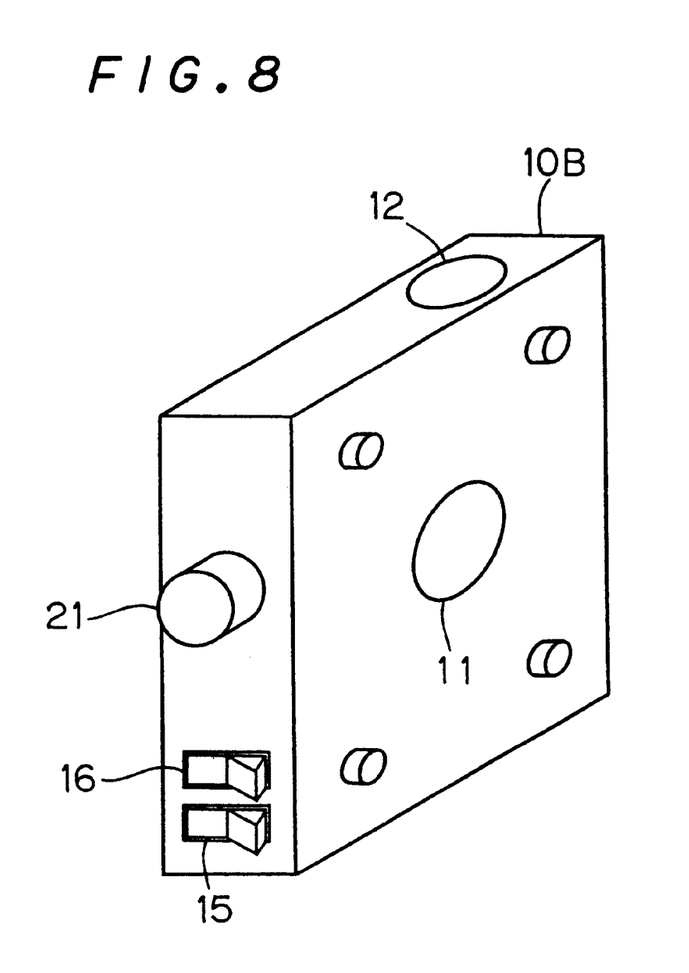
FIG. 8 is an external view of a projector having two air inlets.

It is not absolutely necessary to provide the single air inlet in the projector. Instead, the projector may have two air inlets 11 and 12 as shown in FIG. 8. Ducts may be connected respectively to the air inlets 11 and 12, or one duct may be connected to one of the air inlets 11 and 12. Preferably, the two air inlets 11 and 12 are used for different purposes of cooling the liquid crystal panels 23a, 23b, 23c and of cooling the light source lamp 22, respectively.

The to-be-cooled elements are not limited to the liquid crystal panels and the light source lamp, but may include an element whose normal operation is affected by a temperature rise, e.g. a substrate having a CPU.

The present invention is applicable to a projector which uses a single liquid crystal panel for projection, and a projector which uses a projection slide for projection.

It is not absolutely necessary that the duct is detachable from and attachable to the air inlet of the housing. Instead, the duct may be fixedly mounted to the air inlet or be constructed like a duct 5A to be described below.

Figure 9:
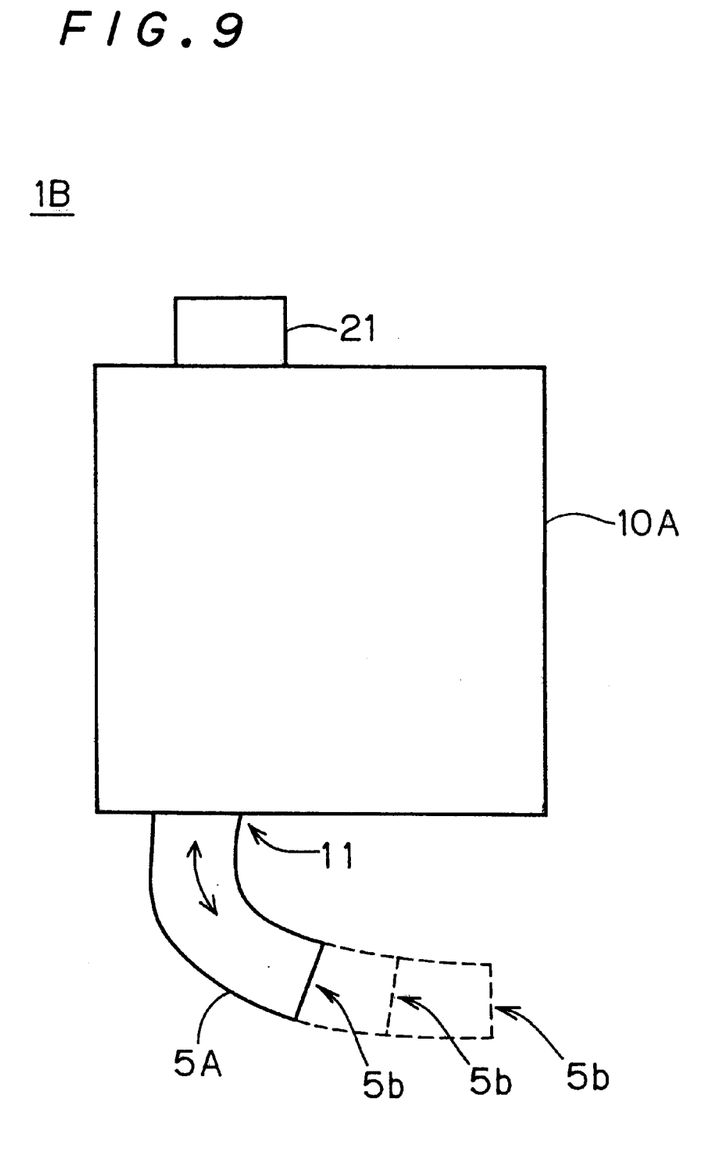
FIG. 9 is a top plan view of a projector according to a modification of the present invention.

FIG. 9 is a top plan view of a projector 1B according to a modification of the present invention.

The projector 1B is similar in construction to the projector 1 of the above-mentioned preferred embodiment, but differs therefrom in the position of the air inlet 11 and in the duct 5A.

The air inlet 11 has a circular opening, and is provided in a rear surface of a housing 10A of the projector 1B.

Like the above-mentioned duct 5, the duct 5A has a tubular shape and is made of a soft material. The duct 5A has such movability that the duct 5A is partially or fully retractable into the housing 10A, for example, by rolling up the duct 5A in the housing 10A.

The duct 5A having such a construction can freely adjust the duct length as required to improve the flexibility of change in the position of the air intake end 5b in space.

<Second Preferred Embodiment>
<Construction of Principal Parts of Projector>

Figure 10:
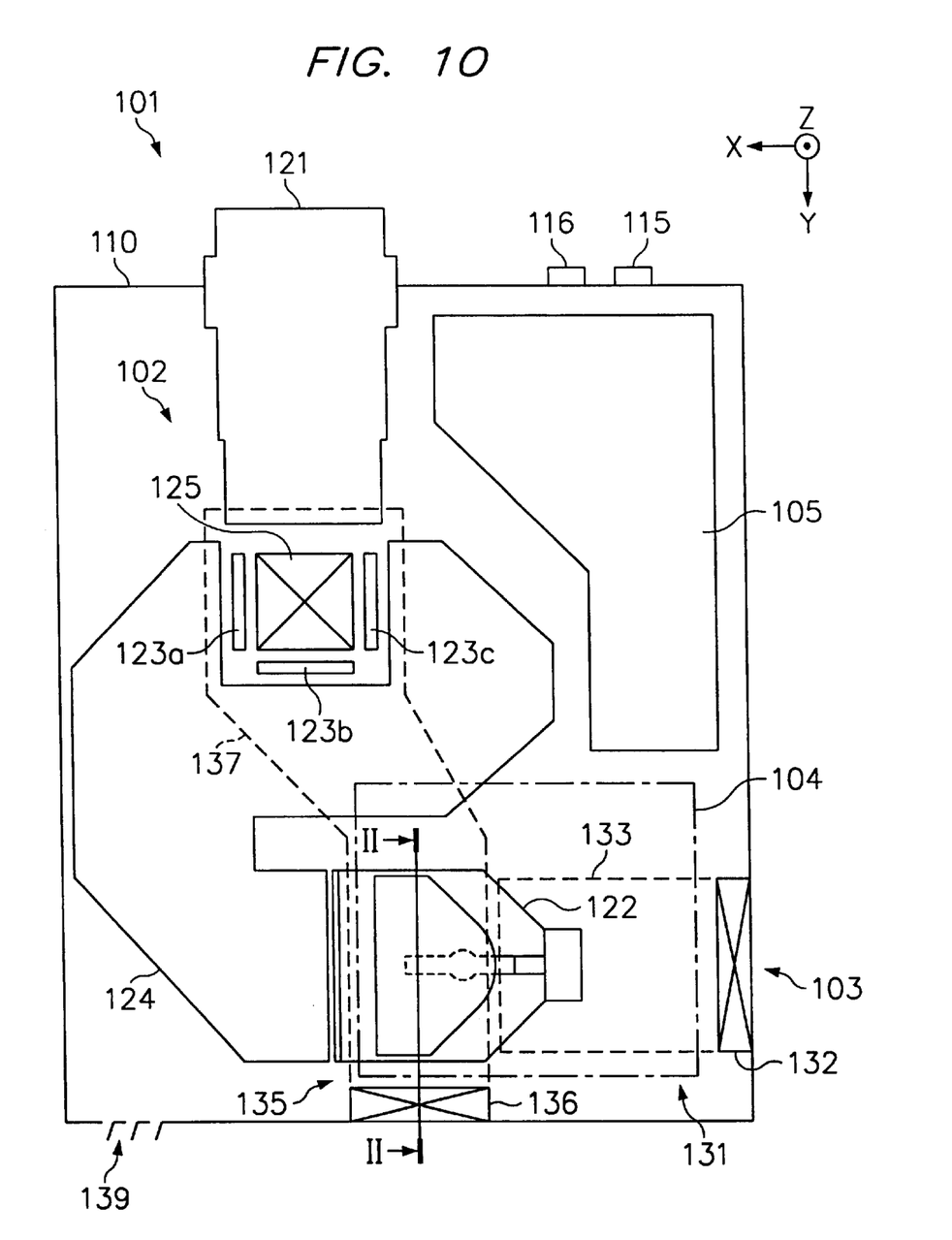
FIG. 10 is a plan view showing a construction of principal parts of a projector according to a second preferred embodiment of the present invention.

FIG. 10 is a plan view showing a construction of principal parts of a projector 101 according to a second preferred embodiment of the present invention.

The projector 101 comprises a projection section 102 housed in a hollow housing 110 having a shape of a rectangular parallelepiped, a cooling section 103 for cooling the projection section 102, an electronic circuit section 104 for controlling the projection section 102 and the cooling section 103, and a power supply section 105 for supplying power to these sections 102 to 104. The projector 101 has a main power switch 115 for switching the power on/off, and a lamp switch 116 for switching on/off a light source lamp (to be described later) 122.

The projection section 102 comprises a projection lens 121, the light source lamp 122, and three liquid crystal panels 123a, 123b, 123c. The projection section 102 further comprises an optical system 124 for separating light incident from the light source lamp 122 into light rays of three primary colors, and a prism 125 for combining together the three light rays passed through the three liquid crystal panels 123a, 123b, 123c.

The light source lamp 122 becomes a heat source which generates heat during use, and therefore is one to-be-cooled element which must be forcedly air-cooled by a cooling air flow.

The liquid crystal panels 123a, 123b, 123c are capable of displaying image information inputted from a personal computer or a tuner connected to the projector 101 for transmission thereof in the form of projected images. In this preferred embodiment, the inputted image information is separated into image components of three primary colors (R (red), G (green) and B (blue)) which in turn are displayed on the respectively corresponding liquid crystal panels 123a, 123b, 123c. The temperature of the liquid crystal panels 123a, 123b, 123c does not remarkably rise when the liquid crystal panels 123a, 123b, 123c themselves are energized. However, the liquid crystal panels 123a, 123b, 123c partially absorb the outgoing light rays from the optical system 124 to store light energy therein, resulting in the temperature rise thereof. Thus, the liquid crystal panels 123a, 123b, 123c which act as heat sources are also to-be-cooled elements.

In the optical system 124, the light ray emitted from the light source lamp 122 is subjected to a polarization conversion, and thereafter a dichroic mirror generates the three primary color light rays (R, G and B) from the above-mentioned light ray. The three generated light rays enter the three liquid crystal panels 123a, 123b, 123c, respectively.

The prism 125 is capable of combining the R, G and B images displayed on the liquid crystal panels 123a, 123b, 123c together to project the resultant image light ray onto the projection lens.

The cooling section 103 comprises a lamp cooling system 131 for delivering a cooling air flow to the light source lamp 122, a panel cooling system 135 for delivering a cooling air flow to the liquid crystal panels 123a, 123b, 123c, and an air exhaust hole 139.

The lamp cooling system 131 has a cooling fan 132 provided along a side wall surface of the housing 110, and an air intake duct 133.

The cooling fan 132 is an axial fan in which a dc motor rotates blades, and forcedly carries outside air (a cooling air flow) external to the projector 101 to the light source lamp 122.

The air intake duct 133 is a rectangular duct having a flow passage of a rectangular cross-sectional shape, and is connected to an air outlet of the cooling fan 132. The air intake duct 133 is made throughout of a thermal insulation material, e.g. expanded polyethylene.

Like the lamp cooling system 131, the panel cooling system 135 has a cooling fan 136 provided along a side wall surface of the housing 110, and an air intake duct 137.

The cooling fan 136 is an axial fan in which a dc motor rotates blades, and forcedly carries the outside air external to the projector 101 to the liquid crystal panels 123a, 123b, 123c.

The air intake duct 137 is a rectangular duct, and is connected to an air outlet of the cooling fan 136. Like the air intake duct 133, the air intake duct 137 is made throughout of a thermal insulation material, e.g. expanded polyethylene. The air intake duct 137 will be described in detail later.

The air exhaust hole 139 comprises a plurality of slits provided in a side surface of the housing 110. The air exhaust hole 139 can exhaust the cooling air (heated air) heat-exchanged by the light source lamp 122 and the liquid crystal panels 123a, 123b, 123c to the outside of the housing 110.

The electronic circuit section 104 comprises a CPU, a semiconductor memory and the like which are mounted on a substrate, and is connected to the projection section 102 and the cooling section 103 to exercise centralized control thereof. The electronic circuit section 104 is a less heat-resistant section which, for example, might malfunction when exposed to an elevated temperature.

The power supply section 105 provides a stable supply of power to the projection section 102, the cooling section 103 and the electronic circuit section 104.

<Air Intake Ducts>

Figure 11:
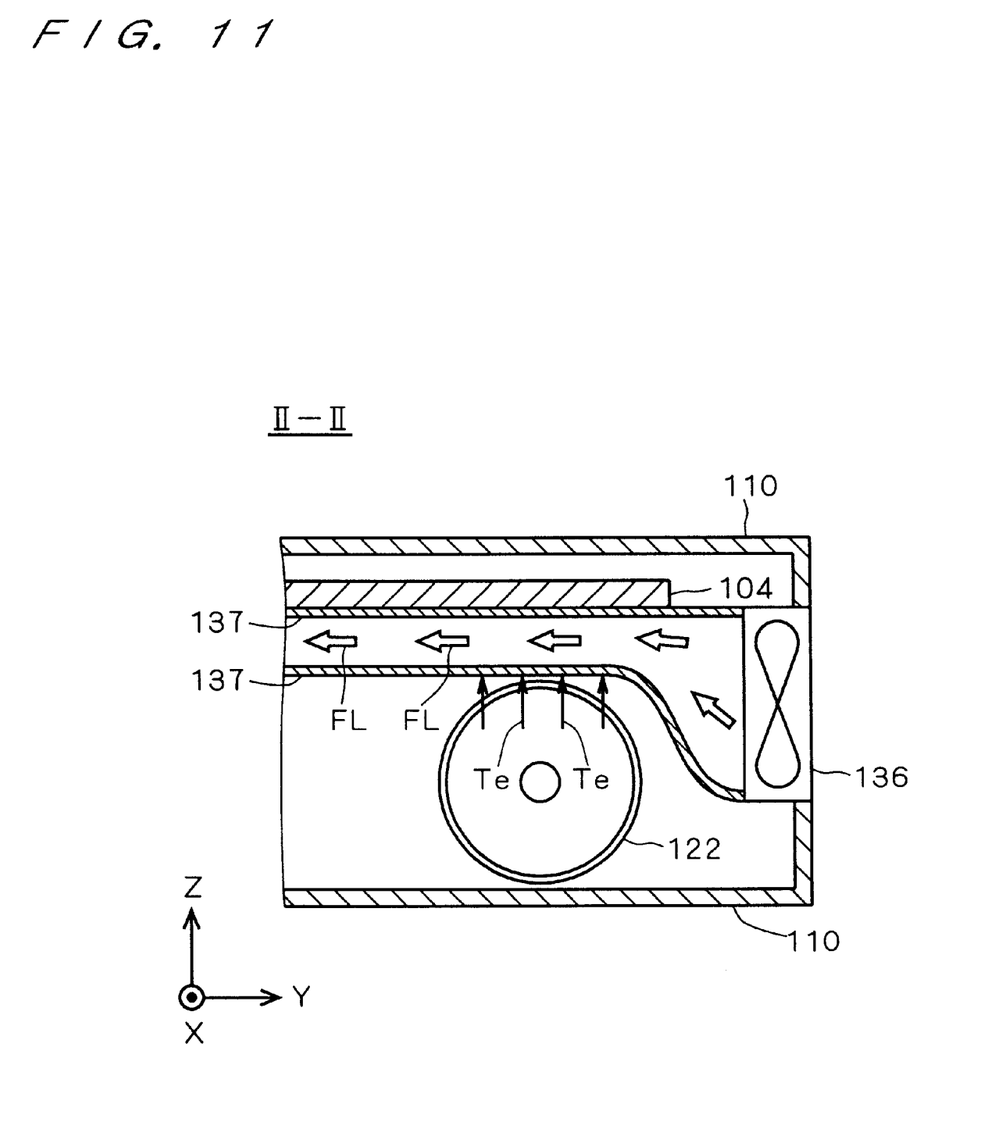
FIG. 11 is a cross-sectional view taken along the line II—II of FIG. 10.

FIG. 11 is a cross-sectional view taken along the line II—II of FIG. 10.

The air intake duct 137 is disposed so as to pass by the light source lamp 122 acting as the heat source. With this arrangement, there is a danger that heat radiation Te from the light source lamp 122 raises the temperature of a cooling air flow FL to decrease the efficiency of cooling the liquid crystal panels 123a, 123b, 123c.

To prevent this, the thermal insulation material is used for the air intake duct 137, as discussed above, thereby to shut off heat entering the air intake duct 137 due to the heat radiation Te from the light source lamp 122. In other words, the cooling air flow FL drawn into the housing 110 by the cooling fan 136 is maintained at a low temperature until it reaches the liquid crystal panels 123a, 123b, 123c to be cooled, and the efficiency of cooing the to-be-cooled elements is improved. Thus, such an arrangement allows the placement of the air intake duct near the heat source to improve the design flexibility of the projector.

Further, the heat-sensitive electronic circuit section 104 is placed near the light source lamp 122. There is apprehension that the heat radiation Te from the light source lamp 122 affects the electronic circuit section 104.

To prevent this, the air intake duct 137 made of the thermal insulation material is placed between the electronic circuit section 104 and the light source lamp 122. This shuts off the direct heat radiation Te from the light source lamp 122 to the electronic circuit section 104 and, in other words, protects the heat-sensitive electronic circuit section 104 from the heat source. Thus, such an arrangement allows the placement of the heat-sensitive component near the heat source to improve the design flexibility of the projector.

Alternatively, placing a mere thermal insulation material, rather than the air intake duct 137, between the electronic circuit section 104 and the light source lamp 122 is expected to produce similar effects. However, this is disadvantageous in the increased number of components constituting the projector 101 and in increased complexity of the internal construction of the projector 101.

The air intake duct 133 made of the thermal insulation material, which has an upper part placed between the electronic circuit section 104 and the light source lamp 122, can also protect the electronic circuit section 104 from the heat from the light source lamp 122 in a similar manner to the above-mentioned air intake duct 137.

As described above, the projector 101 which comprises the air intake ducts made of the thermal insulation material is improved in design flexibility thereof.

<Third Preferred Embodiment>
<Construction of Principal Parts of Projector>

Figure 12:
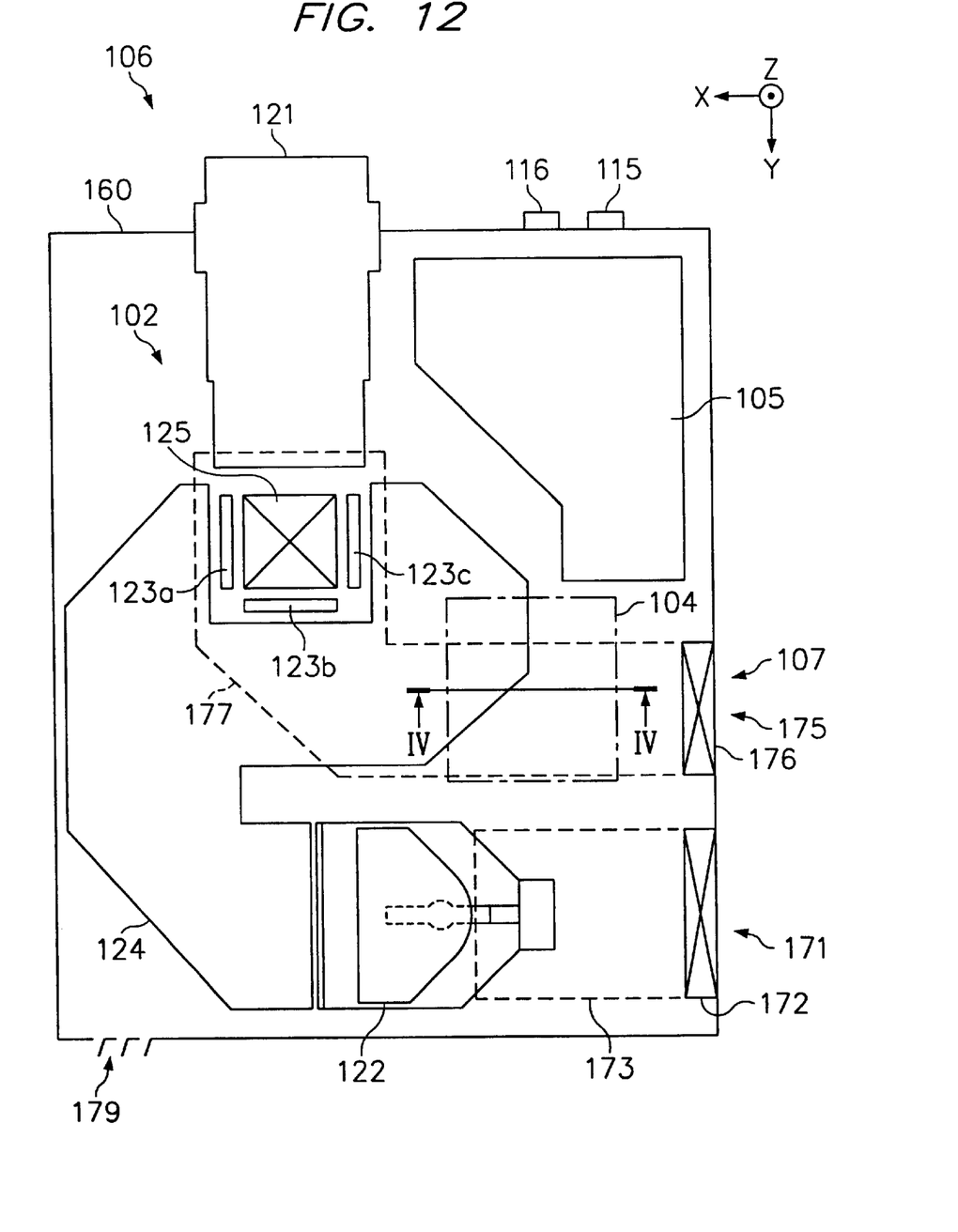
FIG. 12 is a plan view showing a construction of principal parts of a projector according to a third preferred embodiment of the present invention.

FIG. 12 is a plan view showing a construction of principal parts of a projector 106 according to a third preferred embodiment of the present invention. The projector 106 is similar in construction to the projector 101 of the second preferred embodiment, but differs principally therefrom in a cooling section 107 having an air exhaust duct and in placement of the electronic circuit section 104.

The cooling section 107 is housed in a hollow housing 160 having good thermal conductivity, and comprises a lamp cooling system 171 for delivering air heated by the light source lamp 122, a panel cooling system 175 for delivering heated air generated by the liquid crystal panels 123a, 123b, 123c, and an air intake hole 179.

The lamp cooling system 171 has a cooling fan 172 provided along a side wall surface of the housing 160, and an air exhaust duct 173.

The cooling fan 172 is an axial fan in which a dc motor rotates blades, and forcedly carries the heated air generated from the light source lamp 122 to the outside of the projector 106.

The air exhaust duct 173 is a rectangular duct, and is connected to an air inlet of the cooling fan 172. The air exhaust duct 173 is made throughout of a thermal insulation material, e.g. expanded polyethylene.

Like the lamp cooling system 171, the panel cooling system 175 has a cooling fan 176 provided along the side wall surface of the housing 160, and an air exhaust duct 177.

The cooling fan 176 is an axial fan in which a dc motor rotates blades, and forcedly carries the heated air generated from the liquid crystal panels 123a, 123b, 123c to the outside of the projector 106.

The air exhaust duct 177 is a rectangular duct, and is connected to an air inlet of the cooling fan 176. The upper half of the air exhaust duct 177 is made of a material having high thermal conductivity, and the lower half thereof is made of a thermal insulation material, e.g. an expanded or foamed material. An example of the material having high thermal conductivity includes a metal material such as aluminum. The air exhaust duct 177 will be described in detail later.

The air intake hole 179 comprises a plurality of slits provided in a side surface of the housing 160. The air intake hole 179 can supply the outside air into the projector 106.

The electronic circuit section 104 is disposed under the air exhaust duct 177.

<Air Exhaust Ducts>

Figure 13:
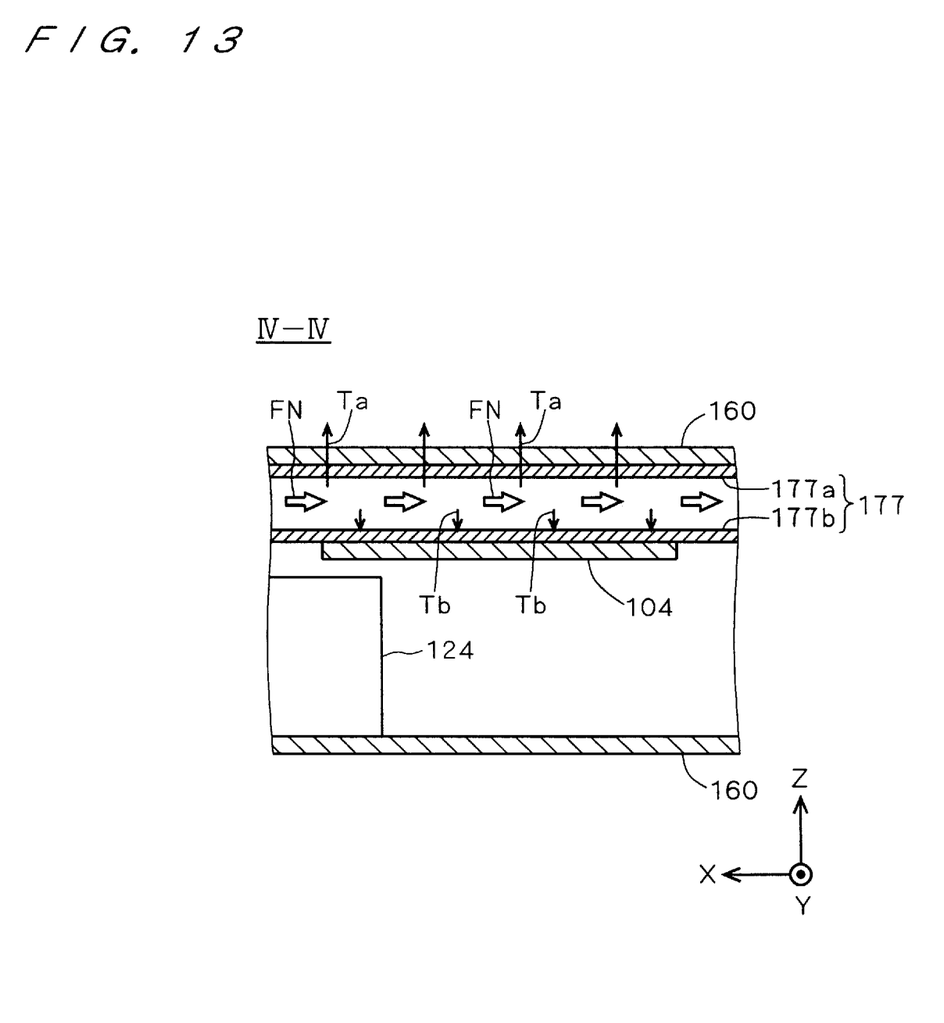
FIG. 13 is a cross-sectional view taken along the line IV—IV of FIG. 12.

FIG. 13 is a cross-sectional view taken along the line IV—IV of FIG. 12.

The air exhaust duct 177 is disposed so that an upper part thereof contacts an inner surface of the housing 160 and a lower part thereof contacts the electronic circuit section 104. With this arrangement, since the heated air (exhaust air) FN generated by the liquid crystal panels 123a, 123b, 123c passes through the inside of the air exhaust duct 177, there is a danger that the air exhaust duct 177 acts as a heat source to affect the heat-sensitive electronic circuit section 104.

To prevent this, the thermal insulation material is used for a lower part 177b of the air exhaust duct 177 which contacts the electronic circuit section 104, as discussed above. This shuts off heat radiation Th from the air exhaust duct 177 to protect the electronic circuit section 104 from the heat radiation Tb. Thus, such an arrangement allows the placement of the heat-sensitive component near the air exhaust duct to improve the design flexibility of the projector.

Further, the material having high thermal conductivity is used for an upper part 177a of the air exhaust duct 177 which contacts the housing 160, as discussed above. This allows positive dissipation of exhaust air heat to the outside of the housing 160 capable of dissipating heat, to decrease the temperature of the exhaust air FN. That is, heat radiation Ta to the outside decreases the temperature of the downstream exhaust air FN to suppress the influence of the exhaust air heat upon the heat-sensitive component. Thus, such an arrangement suppresses the influence of heat radiation from the air exhaust duct upon the heat-sensitive component to improve the design flexibility of the projector.

As discussed above, the projector 106 which comprises the exhaust duct made of a combination of the thermal insulation material and the material having high thermal conductivity is improved in design flexibility thereof.

<Modifications of Second and Third Preferred Embodiments>

It is not absolutely necessary that the ducts are made entirely of the thermal insulation material. The thermal insulation material may be used only for an outer or inner wall portion of the ducts while a material having a low thermal insulation effect is used for other portions.

It is not absolutely necessary that the air intake ducts according to the second preferred embodiment are made throughout of the thermal insulation material. The thermal insulation material may be used only for part of the air intake ducts which is influenced by heat near the heat source. In this case, although there is a likelihood that the effect of suppressing the temperature rise of the cooling air flow is reduced, the amount of thermal insulation material to be used is reduced.

The air exhaust duct 177 according to the third preferred embodiment may be made throughout of the thermal insulation material. In this case, although the effect of lowering the temperature of the exhaust air is not expected in the course of the duct to the cooling fan, the heat-sensitive component is protected from the exhaust air heat which is trapped in the air exhaust duct.

The air exhaust ducts made of the thermal insulation material may also be placed between the heat source such as the light source lamp and the heat-sensitive component. In this case, the air exhaust duct can shut off the direct heat radiation from the heat source to protect the heat-sensitive component.

Examples of the heat-sensitive component include not only the electronic circuit but also an optical component.

The ducts may be partially or fully provided outside the projector. Such an arrangement also can maintain the cooling air flow in the duct at a low temperature without being influenced by an external environment.

The present invention is applicable to a projector which uses a single crystal panel for projection, a projector which uses a projection slide for projection, and the like.

The shape of the ducts is not limited to a rectangular shape, but may be a circular shape and the like.

The thermal insulation material is not limited to the expanded polyethylene but may include expanded urethane foam, foamed silicone rubber, glass wool, polystyrene foam, glass fiber, rock wool or the like.

While the invention has been described in detail, the foregoing description is in all aspects illustrative and not restrictive. It is understood that numerous other modifications and variations can be devised without departing from the scope of the invention.

What is claimed is:

1. A projector comprising:
    a projection section including an optical element for projecting an optical image onto a predetermined image surface;
    a housing for housing said projection section therein and having at least one opening, said housing being hollow;
    a duct disposed to extend from said opening to the outside of said housing, said duct having a connecting end for connection to said opening and an open end open to the outside of said housing; and
    an air flow generator mounted to said housing for generating an intake air flow directed from the outside of said housing through said opening of said housing to a predetermined to-be-cooled portion of said projection section in said housing, said predetermined to-be-cooled portion being a heat-generating optical element,
    wherein said duct is movable to make the position and/or opening direction of said open end variable.

2. The projector according to claim 1, wherein
    said duct is made of a soft or flexible material.

3. The projector according to claim 1, wherein
    said duct is attachable to and detachable from said opening.

4. The projector according to claim 1, wherein
    said air flow generator is capable of generating an exhaust air flow directed from said predetermined to-be-cooled portion of said projection section toward said opening, said projector further comprising
    a selector for changing a driving state of said air flow generator to selectively generate said intake air flow and said exhaust air flow.

5. A projector comprising:
    a projection section including an optical element for projecting an optical image onto a predetermined image surface;
    a housing for housing said projection section therein and having at least one opening, said housing being hollow;
    a duct disposed to extend from said opening to a predetermined to-be-cooled portion of said projection section, said predetermined to-be-cooled portion being a heat-generating optical element, at least part of said duct being made of a thermal insulation material; and
    an air flow generator for generating an intake air flow directed from the outside of said housing through said opening of said housing via said duct to said predetermined to-be-cooled portion in said housing.

6. The projector according to claim 5, wherein
    said duct is made throughout of a thermal insulation material.

7. A projector comprising:
    a projection section including an optical element for projecting an optical image onto a predetermined image surface;
    a housing for housing said projection section therein and having at least one opening, said housing being hollow;
    a duct disposed to extend from said opening to a predetermined to-be-cooled portion of said projection section, said predetermined to-be-cooled portion being a heat-generating optical element, at least part of said duct being made of a thermal insulation material; and
    an air flow generator for generating an exhaust air flow directed from said predetermined to-be-cooled portion in said housing through said opening of said housing via said duct to the outside of said housing.

8. The projector according to claim 7, wherein
    said duct has a portion made of a thermal insulation material and a portion which is not made of a thermal insulation material but is made of a material having high thermal conductivity.

* * * * *